Patented Apr. 5, 1938

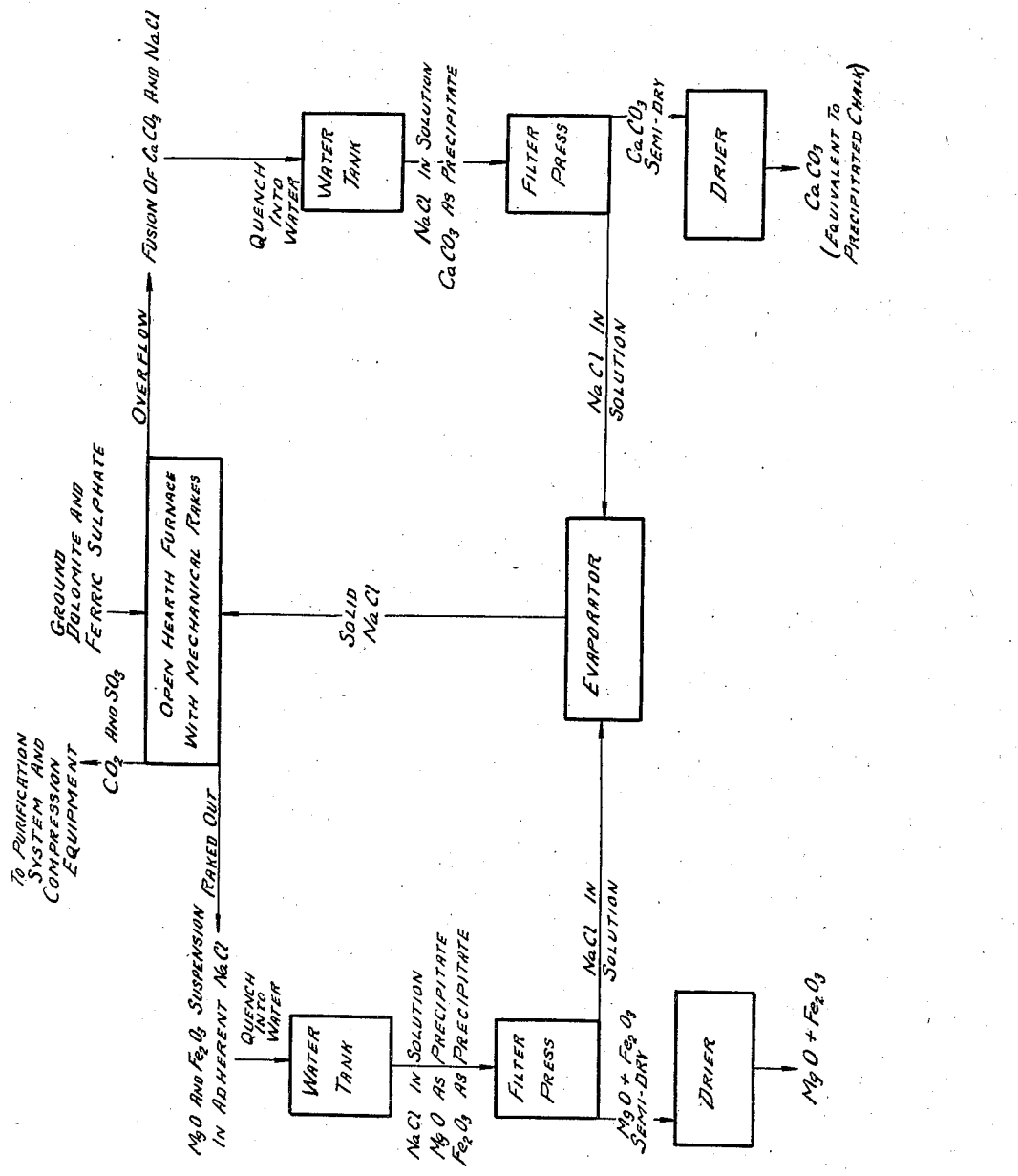

2,112,904

UNITED STATES PATENT OFFICE 2,112,904

THERMAL DECOMPOSITION OF OXY-COMPOUNDS

Harold Simmons Booth, Cleveland Heights, Ohio

Application July 19, 1932, Serial No. 623,457

7 Claims. (Cl. 23—66)

This invention relates to the preparation and purification of certain chemicals and mineral products and has for its object the provision of a new and improved process for producing controlled physical conditions for the performance of certain steps of preparation, purification, composition and decomposition.

One example of my process is illustrated in the accompanying drawing in which the sole figure is a flow sheet for an application of the invention to the decomposition of dolomite.

It is well known that many chemical reactions occur more readily at elevated temperatures than at ordinary temperatures, and further that the direction of some chemical reactions vary with the temperature. It is practically a difficult matter, however, to subject many chemicals to a definitely controlled temperature, especially those chemicals which are of a granular or pulverized nature, since such substances usually have a very restricted conductivity for heat. I have discovered that certain chemical operations can be facilitated very greatly by performing them in contact with a molten anhydrous substance which does not decompose at the temperature employed nor enter into chemical reaction with the raw material or any of its products. I ascribe this action, partly to the greater accuracy with which temperature can be controlled, and partly to the greater concentration of the solution thereby produced which is often far more concentrated than is possible to obtain with water, even when any solution at all is obtainable with water, and partly to the fact that certain reactions occur at quite different temperatures in a molten bath than in the open air. Furthermore the high temperature employed greatly speeds the operation and leads to many reactions not obtainable under other conditions.

One example of a beneficial use of my improved process lies in the separation of minerals ordinarily difficult of separation, and in the selective decomposition of chemical substances. For example dolomite is a well-known, widely-spread and very inexpensive mineral consisting of the carbonates of calcium and magnesium. Where the word "mixture" is used in the specification and claims it is to be understood as including dolomite and similar substances consisting of a plurality of compounds, double salts, and similar complexes. If burned in the manner customary in the burning of lime an inseparable mixture of calcium and magnesium oxide is produce, of much less value than that of either of the ingredients separately. When dolomite is added, however, to a molten bath of an anhydrous salt such as sodium chloride, potassium chloride, or calcium chloride, such dolomite disintegrates with the utmost readiness, the magnesium compound being decomposed with the free and rapid evolution of carbon dioxide and producing a precipitate of magnesium oxide which is insoluble in the melt, while the calcium carbonate dissolves without decomposition producing a limpid solution unless the temperature be raised to a bright white heat which causes decomposition of the calcium carbonate with evolution of carbon dioxide, in which case the calcium oxide is precipitated also. Sodium chloride melts at 805° C. and potassium chloride at 776° C., a mixture of equal molecular parts of NaCl and KCl melts at 660°; a eutectic mixture of LiCl and KCl melts at 360°. The described decomposition of the magnesium carbonate occurs even at this low temperature, but no decomposition of the calcium carbonate occurs until the temperature is raised considerably above the melting point of sodium chloride. (Note that the decomposition of calcium carbonate occurs at a much lower temperature when heated in air.) The facility of solution of the dolomite in any of these fused salts or salt-mixtures is so great that chunks of several grams weight pass readily into reaction, and the evolution of carbon dioxide is so ready and regular as to render its collection a particularly easy task.

While the magnesium oxide is very light and somewhat flocculent, still the molten salt is so limpid and mobile that most of it can be removed by decantation, after which the precipitate can be washed with further quantities of molten salt, or hot filtration can be effected. In this way the magnesia can be separated from the calcium with great completeness. The calcium carbonate can be separated from the molten salt by dissolving the salt in water which precipitates the calcium compound in the form of a very pure and exceedingly finely divided form of whiting, valuable either for paint or chemical industries, after which the salt can be recovered by evaporation; or by elevating the temperature sufficiently the calcium carbonate can be decomposed, driving off carbon dioxide and producing calcium oxide which is precipitated, thus enabling the salt to be decanted and returned to the process without departure from its fused state.

It is of course important to employ as a solvent a molten salt which does not enter into chemical reaction with the substances being decomposed or separated. It is also practically convenient in most cases to employ as a solvent a molten salt which is soluble in water, since otherwise it is difficult if not impossible to separate the solvent from certain of the end products, while a water soluble salt can be separated by solution and recovered by evaporation. In some instances the fact of solubility in water is not important as for example in the separation of dolomite as above described without departing from the fused state.

These fused salts exercise a selective solution upon the contaminants normally occurring with the magnesium compound. Silica, alumina and iron oxide are not soluble and are hence recovered with the magnesia in case the molten salt be one which, like sodium chloride, does not dissolve the magnesia.

Indeed, the effect of the magnesia is to carry down mechanically, during its formation by the decomposition from magnesium carbonate, the other impurities which, though not soluble in the bath, do otherwise have a tendency to disperse readily and make mechanical separation difficult. Carried down with the magnesia, however, these impurities settle easily to the bottom, and the clear solution of calcium carbonate in the salt bath can be readily decanted away.

So much so does this hold true that I have found that, when the proportion of magnesium compound is relatively low with regard to the other impurities, it is desirable deliberately to add some amount of a magnesium compound like magnesium carbonate, or a material high in magnesia, such as a magnesia-rich dolomite. On decomposition, this forms enough magnesium oxide to carry down all the other, insoluble impurities.

It is obvious that any other compound decomposing under the bath conditions will be similarly effective for this purpose. Equally obvious is the fact that this procedure can be used in conjunction with the purification of any compound soluble in a molten salt when such compound is contaminated with substances insoluble in such molten salt.

The separation of the calcium and magnesium by the foregoing procedure appears to be substantially complete as the magnesium carbonate is completely decomposed while no observable decomposition of the calcium carbonate occurs until a temperature is attained which is substantially higher than would produce calcination in air, while the purity and fine division of the calcium carbonate produced by solution or even better by quenching in water renders it unusually valuable for chemical or pigment uses. Its state of division is much greater than in the case of precipitation from aqueous solutions.

To the calcium carbonate in solution in the salt, I frequently find it desirable to add other water-insoluble materials with which it will form a mixed pigment, either white or colored. Such materials need not be soluble in the bath; they can act equally well when merely well suspended. For example, I can suspend iron oxide in the bath; or, as will be described later, decompose an oxy-salt of iron in situ. On quenching in water, the water-insoluble portion will present a finely divided colored mixed pigment of great value.

When sodium chloride is employed as a solvent the magnesium oxide is precipitated and can be removed by decantation or filtering after which the magnesia can be dissolved by ammonium chloride or any other reagent; or the salt can be removed by solution in water leaving the magnesia and the calcium carbonate together in the form of a water-insoluble residue which can be treated with ammonium chloride or otherwise treated with a selectively acting reagent.

The above described procedure for controllably decomposing dolomite is especially valuable in connection with the ammonia soda industry for producing the necessary carbon-dioxide and also for recovering the ammonia. Due to the regular, gentle, and even evolution of carbon-dioxide from the dolomite its recovery in a high degree of purity is particularly easy, while the magnesia thus produced enables the formation of magnesium chloride as an end product which is much less liable to constitute a drug on the market than is the calcium chloride. Furthermore this process enables dolomite limestone to be used which is less expensive than the high calcium limestone generally demanded.

Of course, I am not limited to the use of fused alkali chlorides or alkaline earth chlorides. Other salts, for example the alkali sulfates, operate just as effectively, though they are not quite as economical.

By the term "dolomite" as used in the above description, and similarly when used in the claims, I refer to any material containing substantial amounts of calcium carbonate and contaminated by magnesium carbonate, whether or not such magnesium carbonate is present in equimolecular proportions, and whether or not it is chemically combined with the calcium carbonate, or merely mixed with the same.

The decomposition of dolomite, as above described, is but one of many similar processes possible in accordance with my invention involving the decomposition of oxy-salts, including not only carbonates, but as well sulfates, nitrates, etc. The decomposition of oxy-salts to form oxide pigments, particularly the highly colored pigments like the oxides of iron, chromium, manganese, nickel, etc., under the controllable conditions permitted by my process, is of great commercial value, since these pigments are at present difficult to control in color because of the problems inherent in temperature control during heating operations on a solid material. For example, the extremely cheap by-product iron sulfate can be decomposed to a variety of oxides of iron by contacting with a fused bath of the type mentioned, preferably, but not necessarily, an alkali or alkali earth chloride. Either ferrous sulfate or ferric sulfate will operate in harmony with the principle enunciated; the more economical type of sulfate, of course, is the ferrous salt. In the latter case, reaction is believed to take place essentially as follows:

reduction of the sulfur trioxide acting to oxidize the ferrous oxide obtained by primary decomposition. The ferric sulfate follows simple oxy-compound decomposition rules:

Similarly, chromic oxide of a fine green color can be made from chromium sulfate or from a chromate or dichromate. Where it is economical to use the nitrates or carbonates, these are frequently preferable, since they tend to decompose at lower temperatures than do the corresponding sulfates. Where the nitrates or carbonates are in themselves too expensive, I find it quite convenient to form them in situ by adding a carbonate or a nitrate to the bath.

When a metal forms lower and higher valenced oxides, it is possible to change the state of valence by use of an oxidizing or reducing agent in the bath—as, for example, a nitrate for oxidation. Thus, cobalt and nickel oxides can be obtained in either the divalent or trivalent state from the normal, divalent sulfates, depending on whether the decomposition is effected under strictly neutral conditions, or whether an oxidizing agent is added to the bath, either before, during, or after the decomposition procedure.

In certain cases, I have found it advantageous to form mixed pigments, so as to obtain modified colors, or other modified physical and chemical properties. This I accomplish by having present in the bath, either dissolved or as a suspension, a compound which can act as a pigment diluent or extender. For example, calcium sulfate may be dissolved in a salt bath to which iron sulfate is added, resulting, after treatment with water, in a modified iron oxide pigment.

It is of course possible to first decompose an oxy-compound for example nickel sulfate, only partially by contacting it with a fused bath at a relatively low temperature, thus yielding, in the particular instance, a basic salt. If it is desired to complete the decomposition without increasing the temperature of operation, I have found it possible to add a reagent, for example sodium carbonate, which will act to convert the metal compound into a more easily decomposed compound, here nickel carbonate. This latter compound decomposes immediately at the temperature of operation, yielding essentially pure nickel oxide as the sole water-insoluble constituent of the bath.

Naturally-occurring substances, such as the color earths, ochres, and similar ferruginous materials, are normally calcined to develop their proper color for use as pigments. This process is difficult to control and gives variable results, particularly as regard color. I have found that, by my invention, it is possible to convert such substances, or artificial mixtures of the same type, to useful pigments under controlled conditions.

A naturally occurring sulfate of great economic importance which lends itself readily to my process is the mineral alunite, large deposits of which exist in our western states. This mineral is essentially a mixed sulfate of potassium and aluminum, insoluble in water. It has long been the subject of experiment with a view toward the extraction of its potassium content, but with no great success. I have found that if, in accordance with my invention, alunite is contacted with a molten inert compound, preferably one in which potassium sulfate is fully soluble, at a temperature above the alunite decomposition point, the latter breaks down to yield potassium sulfate and aluminum oxide in the bath. The aluminum oxide being insoluble, it can readily be settled out and the potassium sulfate recovered by any appropriate means from the solvent salt, as by crystallization in water.

An even more practical, and economical, procedure is to treat the alunite by contacting it with fused potassium sulfate, thereby enabling a completely continuous process. The alunite, on decomposing, forms potassium sulfate and aluminum oxide, which latter settles completely, and the decantate is pure potassium sulfate, which can be cooled with or without contact of water to yield commercial fertilizer or chemical potassium sulfate. By periodic raking out of the alumina, the process can be made continuous.

By obvious modifications, my process can also be applied to the recovery of potassium sulfate and the other constituents in such minerals as schönite, $K_2SO_4 \cdot MgSO_4 \cdot 6H_2O$, polyhalite, $$K_2SO_4 \cdot MgSO_4 \cdot 2CaSO_4 \cdot 2H_2O,$$

langbeinite, $2MgSO_4 \cdot K_2SO_4$, etc.

The conversion of lead salts to litharge is another of the oxide decompositions readily accomplished by my process. Large quantities of lead sulfate are available as by products of other operations, but the difficulty of treatment has hitherto acted as an economic drawback to its utilization. Also, galena can be oxidized to lead sulfate if desired. By my process, such lead sulfate, or similar lead salt, like $PbCl_2$, is dissolved in a fused salt like NaCl, an equivalent amount of a metal carbonate, such as alkali or alkaline earth carbonate is added, resulting in the formation of lead carbonate in the bath, which lead carbonate immediately decomposes to lead oxide. This can be settled out from the fused salt; better, leaching the product of fusion with water results in the soluble materials being washed away, and only pure lead oxide remaining behind. By using an alkaline earth carbonate as reactant, with lead sulfate, the alkaline earth sulfate is formed, which remains behind after leaching with water together with the lead oxide, the two forming an extremely fine, light colored pigment. Of course, this latter effect might also be obtained by adding the alkaline earth compound as such to the fusion.

I do not limit myself to the use of the specific compositions of molten bath herein described except as set forth in my several claims which I desire may be construed each according to its own limitations and without reference to limitations contained in other claims. Molten sodium chloride is particularly convenient since it melts at an easily obtained temperature, is resistant to decomposition or reaction with the solutes, and produces a particularly limpid melt, as well as being inexpensive. Potassium chloride is even better in some respects, such as exhibiting a large difference in solubility as between hot and cold water, which enables much of it to be recovered by crystallization while sodium chloride requires more evaporation. A mixture of sodium chloride and potassium chloride in molecular proportions exhibits a lower melting point than either salt separately. In addition to these, other inorganic compounds may be employed provided that they do not decompose on heating or enter into undesirable chemical reactions with the solutes or reagents. Solubility of the salt in water is generally desirable as facilitating the separation of the same from some of the end products of the reaction.

Nor do I limit myself to the specific methods indicated in the description for contacting the reacting substances. It is in some cases advantageous to mix intimately all or part of the reactants and the solvent salts or substances and melt them together while they are being continuously added. I wish my claims to be construed without limitation on the method or order of contacting the reacting substances and solvent salts or substances.

For the purpose of this specification the word "compound" is not to be read as including molecular association complexes or hydration complexes but is to be understood as restricted to true compounds or, so to speak, atomic associations.

Having thus described my invention what I claim is:

1. The process which includes contacting dolomite with a molten, inorganic compound, which is substantially inert to both constituent carbonates, at a temperature above the decomposition point of magnesium carbonate and below that of calcium carbonate, said compound being stable at temperatures substantially above the decomposition temperature of magnesium carbonate.

2. The process which includes contacting dolomite with a molten, inorganic substance of the group consisting of sodium chloride, potassium chloride, lithium chloride, calcium chloride, alkali sulphates and mixtures thereof, at a temperature above the decomposition point of magnesium carbonate and below that of calcium carbonate.

3. The process which includes contacting dolomite with a molten, inorganic substance of the group consisting of alkali and alkaline earth chlorides, at a temperature above the decomposition point of magnesium carbonate and below that of calcium carbonate.

4. The process which includes contacting dolomite with a molten, inorganic water soluble compound, which is substantially inert to both constituent carbonates, at a temperature above the decomposition point of magnesium carbonate and below that of calcium carbonate, said compound being stable at temperatures substantially above the decomposition temperature of magnesium carbonate.

5. The process which includes contacting a mixture of a dolomite, and magnesium oxide with a molten, inorganic compound, which is substantially inert to the constituents of the mixture, at a temperature above the decomposition point of magnesium carbonate and below that of calcium carbonate, said compound being stable at temperatures substantially above the decomposition temperature of magnesium carbonate.

6. The process which includes contacting dolomite with a molten, inorganic water soluble compound, which is substantially inert to both constituent carbonates, at a temperature above the decomposition point of magnesium carbonate and below that of calcium carbonate, said compound being stable at temperatures substantially above the decomposition temperature of magnesium carbonate, removing the insoluble magnesium oxide from the reaction mixture and then elevating the temperature of the remainder of the reaction mixture to a point above the decomposition point of calcium carbonate.

7. The process of treating dolomitic limestones which contains the steps of contacting dolomite with a molten bath of a substance maintained between about 360° C. and the decomposition temperature of calcium carbonate, said substance being one which is solid at ordinary temperatures, and melts at said temperatures without decomposition and does not react with constituents of dolomite and is soluble in water, and afterwards removing said substance from the insoluble residue by solution in water.

HAROLD SIMMONS BOOTH.